United States Patent [19]
Lee

[11] Patent Number: 6,043,951
[45] Date of Patent: Mar. 28, 2000

[54] METHOD, APPARATUS, AND MAGNETIC DISK FOR OPTIMIZING OFF-TRACK POSITION OF A MAGNETORESISTIVE HEAD

[75] Inventor: Hae-Joung Lee, Suwon, Rep. of Korea

[73] Assignee: SamSung Electronics Co., Ltd., Suwon, Rep. of Korea

[21] Appl. No.: 08/922,308

[22] Filed: Sep. 2, 1997

[30] Foreign Application Priority Data

Sep. 2, 1996 [KR] Rep. of Korea ............. 96-37912

[51] Int. Cl.$^7$ ................................. G11B 5/596
[52] U.S. Cl. ........................... 360/77.08; 360/75
[58] Field of Search ................. 360/77.04, 75, 360/77.02, 77.08, 48, 77.05

[56] References Cited

U.S. PATENT DOCUMENTS

| | | |
|---|---|---|
| 4,700,244 | 10/1987 | Fasen et al. . |
| 5,073,833 | 12/1991 | Best et al. .................. 360/77.04 X |
| 5,202,802 | 4/1993 | Sidman . |
| 5,257,149 | 10/1993 | Meyer . |
| 5,274,511 | 12/1993 | Ikeda . |
| 5,311,379 | 5/1994 | Shinohara et al. . |
| 5,325,245 | 6/1994 | Shimizu et al. . |
| 5,339,207 | 8/1994 | Moon et al. . |
| 5,455,724 | 10/1995 | Suzuki et al. . |
| 5,500,776 | 3/1996 | Smith . |
| 5,570,247 | 10/1996 | Brown et al. . |
| 5,587,850 | 12/1996 | Ton-that ..................... 360/77.08 |
| 5,596,463 | 1/1997 | Hashimoto ................. 360/77.04 X |
| 5,602,703 | 2/1997 | Moore et al. . |
| 5,606,469 | 2/1997 | Kosugi et al. . |
| 5,615,063 | 3/1997 | Kuroki et al. . |
| 5,715,105 | 2/1998 | Katayama et al. ............. 360/77.08 X |
| 5,786,957 | 7/1998 | Inoue et al. .................. 360/77.08 |
| 5,854,715 | 12/1998 | Takagi ........................ 360/77.08 X |
| 5,867,343 | 2/1999 | Le et al. ..................... 360/77.04 X |
| 5,892,634 | 4/1999 | Ito et al. ..................... 360/77.08 |
| 5,953,178 | 9/1999 | Takatsuka et al. ............ 360/77.07 X |

*Primary Examiner*—Aristotelis M. Psitos
*Assistant Examiner*—James L Habermehl
*Attorney, Agent, or Firm*—Rober E. Bushnell, Esq.

[57] ABSTRACT

An off-track optimizing apparatus, disk, and method for raising track density of a hard disk drive using a magnetoresistive head. An optimal off-track amount is detected in an initial test process of a hard disk drive, and an additional position detection signal is written into a specific area of a disk. During track follow, the magnetoresistive head is on-tracked in a specific track by using the additional position detection signal.

17 Claims, 7 Drawing Sheets

METHOD, APPARATUS, AND MAGNETIC DISK FOR OPTIMIZING OFF-TRACK POSITION OF A MAGNETORESISTIVE HEAD

CLAIM OF PRIORITY

This application makes reference to, incorporates the same herein, and claims all benefits accruing under 35 U.S.C. §119 from an application for OFF-TRACK OPTIMIZING METHOD FOR RAISING TRACKING DENSITY OF MAGNETORESISTIVE HEAD earlier filed in the Korean Industrial Property Office on the 2nd day of September 1996 and there duly assigned Serial No. 1996-37912, a copy of which application is annexed hereto.

BACKGROUND OF THE INVENTION

1. Field of the Invention

The present invention relates to a hard disk drive and, more particularly, to a disk drive and a method adapted to determine a signal width providing an optimal off-track position for a magnetoresistive head, and to a magnetic disk having a servo burst with such a signal width written in a specific area thereupon. The invention enables the track density of the disk to be raised by using the servo burst during track following operations.

2. Description of the Related Art

Generally, a hard disk drive magnetically writes data onto and reads data from a rotating magnetic disk. Such disk drives are widely used as auxiliary memory devices in computer systems because they can access large amounts of data at high speeds. A hard disk drive typically stores data in several substantially circular tracks arranged concentrically on a surface of the disk. The disk drive includes at least one magnetic head that accesses these tracks to read data from and write data to the magnetic disk. Heretofore, the heads used in disk drives have mainly been magnetic inductive heads such as Metal In Gap (MIG) heads or thin film heads of a standard ring type.

Magnetic inductive head technology has certain limitations that have increasingly caused the disk drive industry to move toward the use of magnetoresistive heads. Unlike magnetic inductive heads, the performance of magnetoresistive heads depends only slightly upon the time rate of change of magnetic flux between polarized regions on the disk surface. This relative insensitivity to flux change rate allows a magnetoresistive head to perform acceptably when the rotational speed of the disk is increased. A magnetoresistive head therefore can perform well with a disk having greatly increased linear density of flux change (measured in units of Flux Change Per Inch, or FCPI) which is linear density of flux change in the track direction (i.e., the circumferential direction).

Despite this advantage, certain limitations of magnetoresistive head technology have delayed the widespread use of magnetoresistive heads. One particularly serious limitation has been that, due to their structural features, magnetoresistive heads require a radial track density (measured in Tracks Per Inch, or TPI, which represents the spacing between tracks in the radial direction) relatively lower than that required for thin film heads. These structural features create a track shift as between the reading portion of the head and the writing portion of the head. Unless the disk drive successfully compensates for it, this track shift reduces the maximum (radial) track density that can be accommodated by the magnetoresistive head.

The track shift inherent in a magnetoresistive head exists because of a difference between the effective radial position of a given track with respect to the read portion and the effective position with respect to the write portion. Such a difference is significant, of course, because the magnetoresistive head, in addition to reading user data from the disk, also desirably reads servo data used for determining the position of the head with respect to a desired track. The existence of the track shift means that, when the read portion of the head is accurately centered over the track, the write portion of the head is positioned away from the track center.

This off-track position usually deviates only slightly from the track center, but the amount of deviation nevertheless significantly affects the maximum track density that the head can accommodate. With even a slight off-track deviation, the inter-track spacing must be commensurately increased to prevent a write operation with respect to the given track from interfering with data recorded on an adjacent track. Because increasing the inter-track spacing reduces the track density, compensating for the off-track deviation of the write portion of the head has become a high priority in efforts to use magnetoresistive heads in conjunction with high-density disks.

Various ingenious approaches have been suggested to address this problem. For example, U.S. Pat. No. 5,615,063, entitled "Magnetoresistive Head Bias Current Switching Based On Skew Angle" and issued Mar. 25, 1997 to Kuroki et al., the disclosure of which is incorporated herein by reference, discloses an off-track compensation system using current reversal in the read portion of the magnetoresistive head. This current reversal causes the head to detect an effective servo signal that partly compensates for the track shift between the read portion and the write portion of the head.

U.S. Pat. No. 5,596,463, entitled "Recording/Reproduction Apparatus With An Integrated Inductive Write, Magnetoresistive Read Head" and issued Jan. 21, 1997 to Hashimoto, the disclosure of which is incorporated herein by reference, provides another approach for addressing the track shift problem. This patent shows a mechanical compensator that adjusts the orientation of the magnetoresistive head with respect to the actuator as the head moves radially along the disk. By turning the head in this manner, at least some of the variation in track shift between tracks is compensated.

A possible alternative to electrical and mechanical off-track compensation systems is to intentionally place the read portion of the magnetoresistive head in an off-track position selected to center the write portion of the head over the track to be written. The difficulty with such an approach resides in selecting the off-track position for the read head. To effectively compensate for the intrinsic off-track of the head, a track shift should be predicted for each track individually.

Theoretically, this prediction could be carried out by a controller of the disk drive in accordance with a mathematical model of the variation of track shift with radial position of the track. In practice, though, such computational prediction it is not easy to carry out with sufficient accuracy because the magnitude of track shifts varies with the structure of the head and numerous other factors that differ between individual disk drive units. Prediction of track shifts relative to uncompensated servo burst signals also can result in reduced sensitivity of servo control if the track shifts are large.

What has been needed, and what seemingly has not yet been found, is a compensation approach that uses the disk itself to provide off-track compensation information. Some efforts to compensate for other types of off-track error have used servo signals written to the disk. For example, U.S. Pat. No. 5,606,469 shows a method that uses an additional servo pattern written to a data disk to compensate for an apparent off-track condition that arises when a servo head reading a dedicated servo surface and a data head reading servo information from the data disk fall out of calibration.

The objective of the '469 patent, though, is to ensure that the data head reads from the center of the data track as defined by track-centering servo burst patterns. It provides a servo burst pattern that enables the read transducer to be centered on a given track despite the fact that the transducer incorrectly reads the standard servo patterns provided for track centering. The disclosed system therefore operates in a manner opposite to the desired operation for compensation of track shifts associated with a magnetoresistive head. In fact, the disclosure of this patent does not address magnetoresistive heads or the special off-track problems that arise with them.

U.S. Pat. No. 5,339,207 also uses an additional signal field in a servo sector of a disk, but here the objective is to determine the head transducer gain and to measure the width of the read transducer during calibration of the disk drive. A method is disclosed for writing a filler pattern in the servo sector following a standard pattern of servo bursts. This filler pattern is uniform for all odd-numbered tracks and for all even-numbered tracks, and thus it cannot provide off-track information for compensation of track shifts associated with a magnetoresistive head. In fact, as with the '469 patent, the disclosure of this patent does not address magnetoresistive heads or the special off-track compensation problems associated with them.

I have therefore found that a continuing and unmet need exists for an effective and efficient approach to compensation for the off-track deviation caused by track shifts in magnetoresistive heads. An invention realizing such an approach would provide rapid and accurate compensation of track shifts appropriate for the particular components of the disk drive and would not require model-based prediction calculations. Such an invention also should not rely upon electrical or mechanical techniques whose precision could suffer under adverse environmental conditions or as the apparatus ages. Preferably, the invention could be implemented with few or no hardware changes to existing designs for disk drive servo control systems.

SUMMARY OF THE INVENTION

It is therefore an object of the invention to provide a method for detecting an optimal off-track amount in an initial test process of a hard disk drive using a magnetoresistive head and for writing an additional burst signal into a specific area of a disk so as to be used during track follow-up.

To achieve this and other objectives, the present invention provides a magnetic disk drive apparatus comprising a magnetic disk having a storage surface and a plurality of data tracks arranged concentrically on the storage surface; a magnetoresistive head located movably adjacent to the storage surface and including a magnetoresistive sensor and a write pole separated from the magnetoresistive sensor by a predetermined distance, with the magnetoresistive head having associated therewith for each one of the plurality of data tracks a track shift corresponding to the data track; a memory storing program data representative of an execution program, with the program data including data representative of an initialization routine for controlling the magnetoresistive head to write an additional burst signal for a selected one of the plurality of data tracks, with the additional burst signal indicating an optimal off-track distance for positioning the magnetoresistive head to compensate for the track shift corresponding to the data track; and a microcontroller in communication with the memory and adapted to control a radial position of the magnetoresistive head with respect to the storage surface in accordance with the execution program.

The present invention also provides, in a second aspect, a magnetic disk drive apparatus comprising a magnetic disk having a storage surface and a plurality of data tracks arranged concentrically on the storage surface; a magnetoresistive head located movably adjacent to the storage surface and including a magnetoresistive sensor and a write pole separated from the magnetoresistive sensor by a predetermined distance, with the magnetoresistive head having associated therewith for each one of the plurality of data tracks a track shift corresponding to the data track; a microcontroller adapted to control a radial position of the magnetoresistive head with respect to the storage surface in accordance with an execution program; and a memory storing program data representative of the execution program, with the program data including data representative of a compensation routine for compensating for the track shift corresponding to a selected one of said plurality of data tracks by positioning the magnetoresistive head at an optimal off-track distance from a center of the data track in response to a detection signal corresponding to an additional burst signal for the data track and with the additional burst signal indicating the optimal off-track distance.

The present invention further provides a magnetic disk comprising a storage surface; and a plurality of data tracks arranged concentrically on the storage surface, with a selected one of the data tracks having an additional burst signal indicating an optimal off-track distance for positioning a magnetoresistive head associated with the magnetic disk at a position to compensate for a track shift associated with the magnetoresistive head and corresponding to the data track.

The present invention also provides, in a further aspect, a method for initializing a magnetic disk of a hard disk drive apparatus having a magnetoresistive head associated with the magnetic disk, the method comprising the steps of positioning a magnetoresistive sensor of the magnetoresistive head at an on-track position with respect to a specified data track of the magnetic disk; writing a first additional burst signal in an additional burst signal area of a servo sector of the data track with a write pole of the magnetoresistive head while the magnetoresistive sensor is positioned in the on-track position; generating with the magnetoresistive sensor a detection signal corresponding to the first additional burst signal while gradually moving the magnetoresistive sensor away from the on-track position in a direction corresponding to an increase in magnitude of the detection signal; identifying as an optimal off-track distance for the data track a distance of the magnetoresistive sensor away from the on-track position for which the magnitude of the detection signal has a maximum value; and writing a second additional burst signal in the additional burst signal area, with the second additional burst signal indicating the optimal off-track distance for the data track.

Also provided by the present invention, in yet another aspect, is a method of compensating for track shifts associated with a magnetoresistive head of a magnetic disk drive apparatus, the method comprising the steps of positioning a magnetoresistive sensor of the magnetoresistive head at an on-track position with respect to a specified data track of a magnetic disk associated with the magnetoresistive head; reading an additional burst signal for the data track, with the additional burst signal indicating an optimal off-track distance for positioning the magnetoresistive head to compensate for a track shift associated with the magnetoresistive head and corresponding to the data track; and positioning the magnetoresistive read sensor at the optimal off-track distance away from the on-track position.

BRIEF DESCRIPTION OF THE DRAWING FIGURES

A more complete appreciation of this invention, and many of the attendant advantages thereof, will be readily apparent as the same becomes better understood by reference to the following detailed description when considered in conjunction with the accompanying drawing figures, in which like reference symbols indicate the same or similar components, wherein.

DETAILED DESCRIPTION OF THE PREFERRED EMBODIMENT

Figure 1:
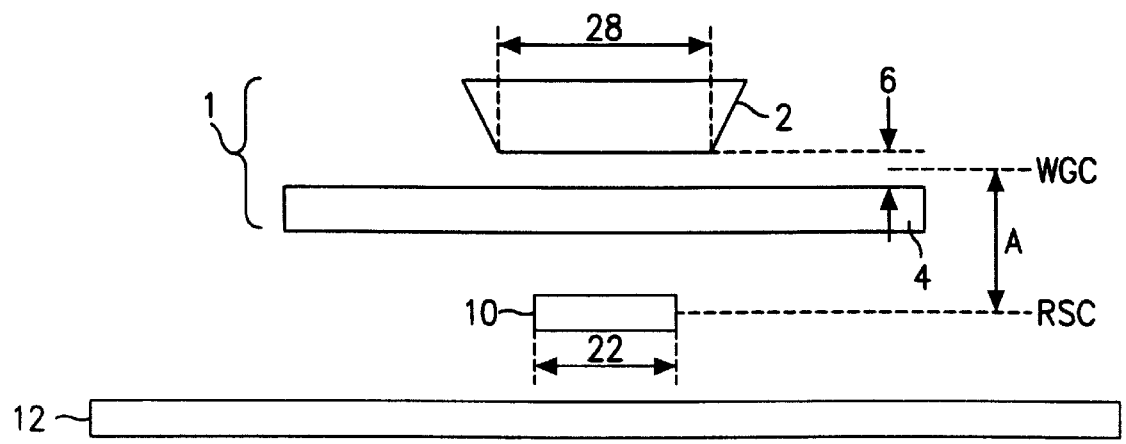
FIG. 1 is a plan diagram of a generic magnetoresistive head.
Figure 2:
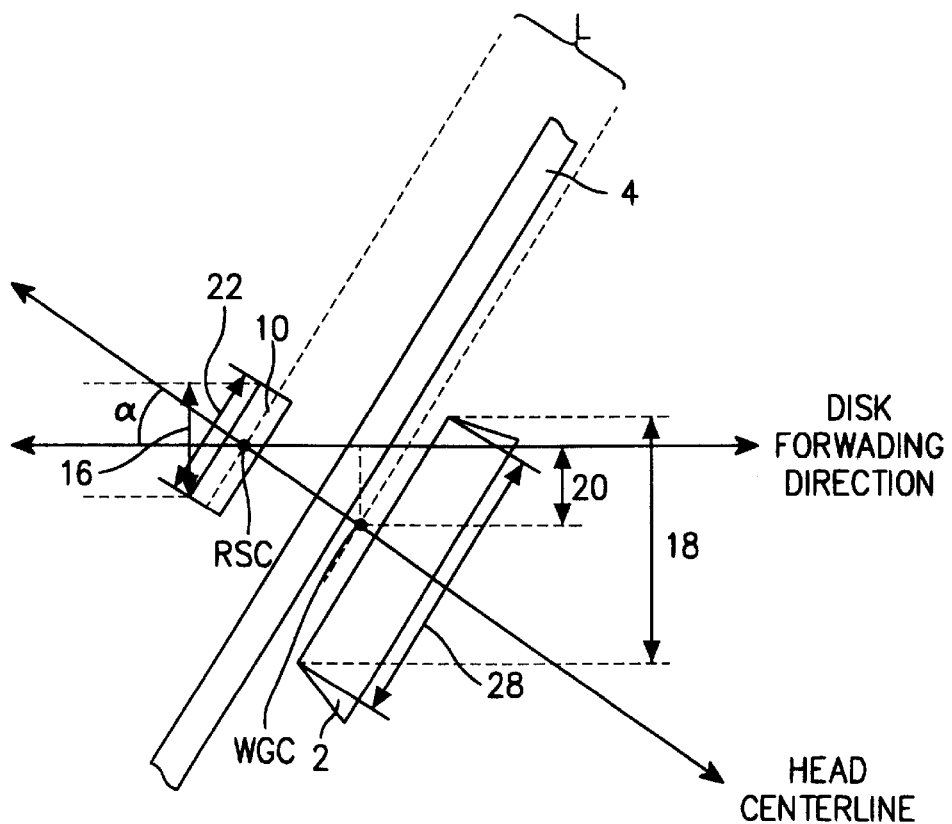
FIG. 2 is a diagram of the magnetoresistive head of FIG. 1 showing a track shift when the head has a deviation angle a with respect to the circumferential direction of the disk.
Figure 3:
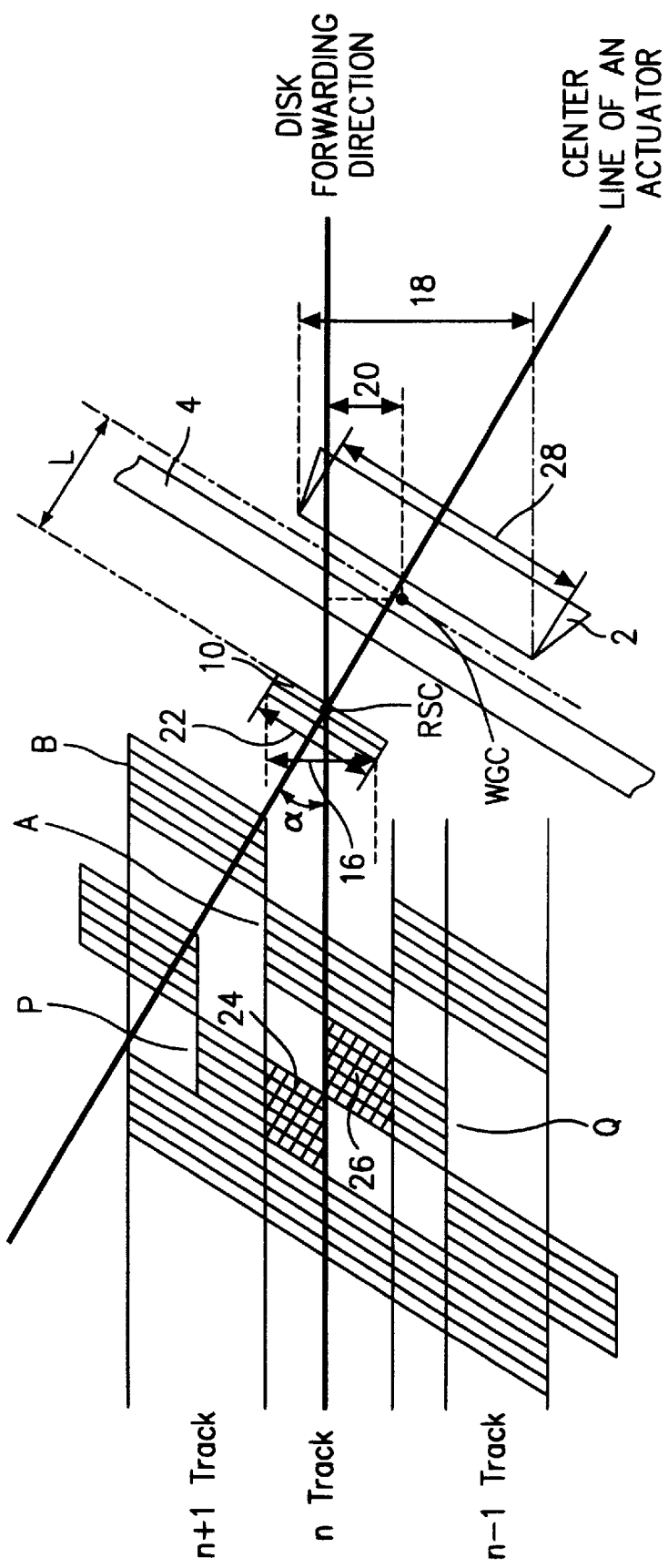
FIG. 3 is a diagram similar to FIG. 2 but shows a track shift generated by a deviation angle a when the magnetoresistive head of FIG. 1 is used with a servo system having four burst signals in a servo sector of the disk.

FIGS. 1–3 illustrate the general construction of a magnetoresistive head and the off-track problem to which the present invention is addressed. FIG. 1 is a plan view of a generic magnetoresistive head. A write pole 1 is used when writing data to a disk and consists of an upper pole 2 and a lower pole 4. The two poles 2 and 4 are separated by a gap 6 of a predetermined dimension that depends upon the design of the head. A magnetoresistive (MR) sensor layer 10 and lower pole 4 are protected by a lower barrier 12. MR sensor layer 10 includes a magnetoresistive element for reading data written onto the disk. A read sensor center RSC of MR sensor layer 10 and a write gap center WGC of the gap 6 are separated by a distance A.

FIG. 2 illustrates the magnetoresistive head of FIG. 1 in a typical read/write orientation with respect to a disk. A deviation angle α with respect to the head and the disk generates a track shift between MR sensor layer 10 and write pole 1. The deviation angle a is the angle between the disk traveling direction (i.e., the circumferential direction of the disk) and the head centerline as defined by read sensor center RSC and write gap center WGC. The magnitude of deviation angle a depends upon the radial position of the head with respect to the disk.

If the head were oriented with its centerline parallel to the circumferential direction of the disk, then the deviation angles would be zero (α=0) and MR sensor layer 10 would have an effective read track width 16 equal to a read track width 22. In practice, however, deviation angle α is generally nonzero, which means that effective write track width 18 and an effective read track width 16 have values obtained, respectively, by multiplying a write track width 28 and read track width 22 by the cosine of the deviation angle α. Moreover, in the case of nonzero α the magnetoresistive head has a nonzero track shift.

FIG. 3 shows the effect of a track shift when the magnetoresistive head is used with a servo system employing, for example, four burst signals. In this case, when performing track seeking and track following operations, the magnetoresistive head detects four burst signals P, Q, A, and B. For example, in order to write data onto a specified track n, the head may be positioned over the center of track n, where it will pass over a part 24 of burst signal P and a part 26 of burst signal Q having the same size. MR sensor 10 will generate detection signals corresponding to burst signals P and Q as it passes over them, and the on-track position of MR sensor 10 results in these detection signals having the same magnitude.

In this case, read track width 22 corresponds to effective read track width 16. With MR sensor 10 centered over the track, however, a track written through upper pole 2 is shifted away from the nominal track center as identified by the detection signals generated by MR sensor 10. In theory, the magnitude of this track shift is given by Lsinα, where α and L are, respectively, the deviation angle and the length of the interval between read sensor center RSC of the MR sensor layer 10 and write gap center WGC of gap 6. This track shift is indicated in FIG. 3 by the reference numeral 20. It is noted that track shift 20 has a definite value for each track but will depend, in general, upon the characteristics of the magnetoresistive head and the actuator moving the head and upon the radial position of the track on the disk. A model-based prediction method for track shift compensation would simply off-track MR sensor 10 by a predicted track shift distance given by L sin α.

Figure 4:
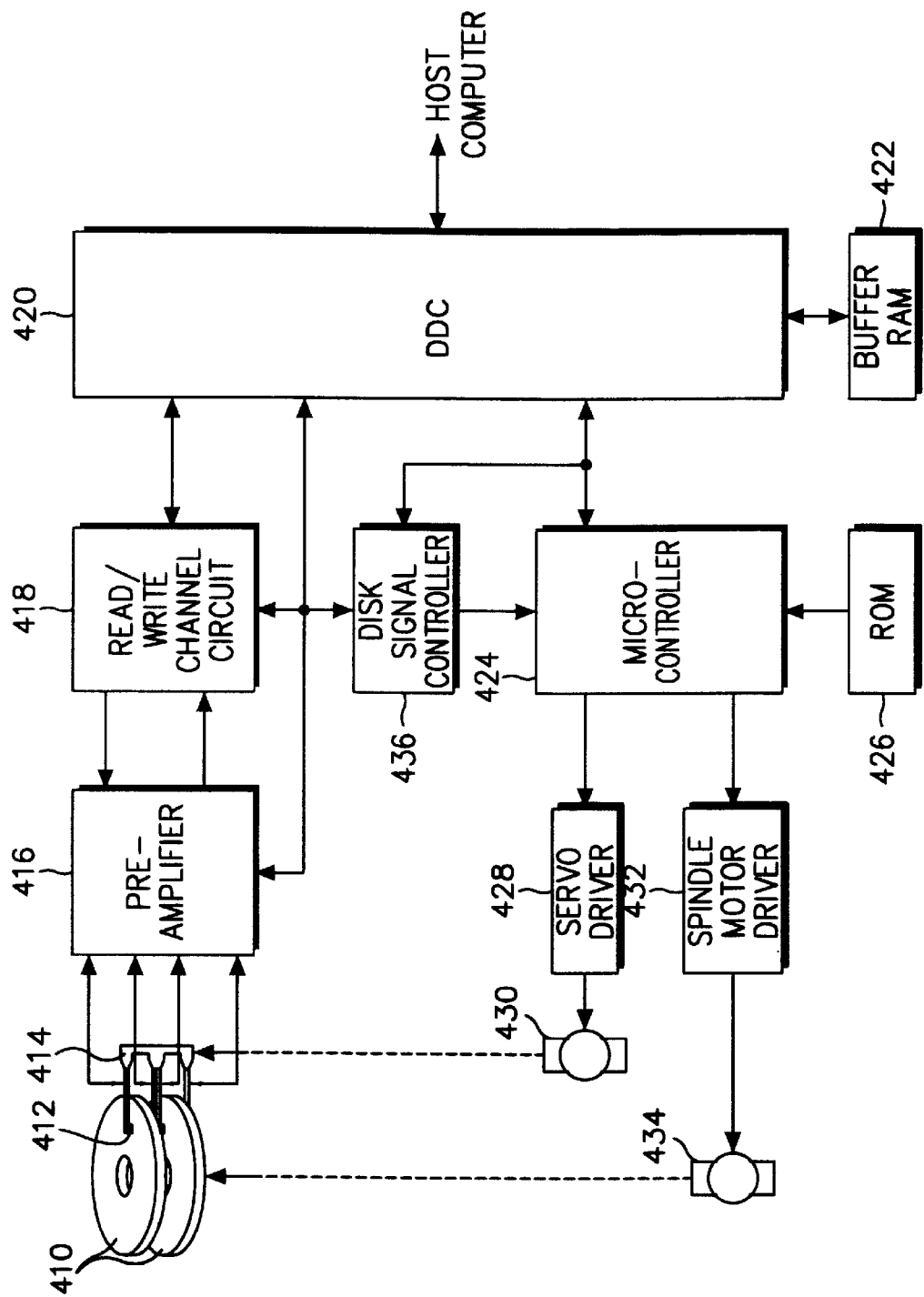
FIG. 4 is a block diagram of a hard disk drive adapted to writing an additional burst in a servo sector of a disk in accordance with the present invention.

FIG. 4 is a block diagram of a hard disk drive apparatus adapted to write an additional burst signal for more effective track shift compensation, in accordance with the principles of the present invention. A plurality of disks 410 are rotated by a spindle motor 434. A plurality of magnetoresistive heads 412 are respectively positioned adjacent surfaces of corresponding ones of disks 410. An E-block assembly 414 includes support arms for supporting heads 412 and is coupled to a rotary voice coil actuator 430.

A pre-amplifier 416 manipulates signals to and from heads 412 during read and write operations. During read operations, pre-amplifier 416 pre-amplifies a signal detected by one of heads 412 and supplies an analog read signal to a read/write channel circuit 418. Read/write channel circuit 418 detects and decodes a data pulse from the read signal received from pre-amplifier 416 and supplies the decoded data pulse to a disk data controller (DDC) 420. During write operations, pre-amplifier 416 writes encoded write data received from read/write channel circuit 418 into one of disks 410 through a corresponding one of heads 412. Read/write channel circuit 418 also decodes the write data received from DDC 420 and supplies the decoded data to pre-amplifier 416.

DDC 420 writes data received from a host computer onto a disk through read/write channel circuit 418 and pre-amplifier 416 and reads data from a disk and supplies the read data to a host computer (not shown). DDC 420 also provides a communications interface between the host computer and a microcontroller 424. A buffer Random Access Memory (RAM) 422 temporarily stores data transmitted between the host computer, microcontroller 424, and read/write channel circuit 418. Microcontroller 424 controls DDC 420 in response to a read or write command received from the host computer and controls track seeking and track following operations.

A Read Only Memory (ROM) 426 stores an execution program and various setting values for microcontroller 424. In particular, ROM 426 may store a disk initialization routine that enables microcontroller 424 to write additional burst signals on disks 410 for track shift compensation, and a compensation routine that enables microcontroller 424 to perform effective track shift compensation using those additional burst signals. The basic procedures carried out by these routines will be described in detail below.

A servo driver 428 supplies a driving current to a voice coil actuator 430, thereby driving actuator 430 in accordance with a position control signal generated by microcontroller 424 for positioning magnetoresistive heads 412. Actuator 430 transports magnetoresistive heads 412 to respective positions relative to disks 410 in response to the direction and magnitude of the driving current received from servo driver 428. A spindle motor driver 432 rotates disks 410 by driving spindle motor 434 according to a rotation control value generated by microcontroller 424 for disks 410. A disk signal controller 436, under the control of microcontroller 424, generates various timing signals necessary for read and write operations and also decodes servo data and supplies the decoded servo data to microcontroller 424.

Figure 5A:
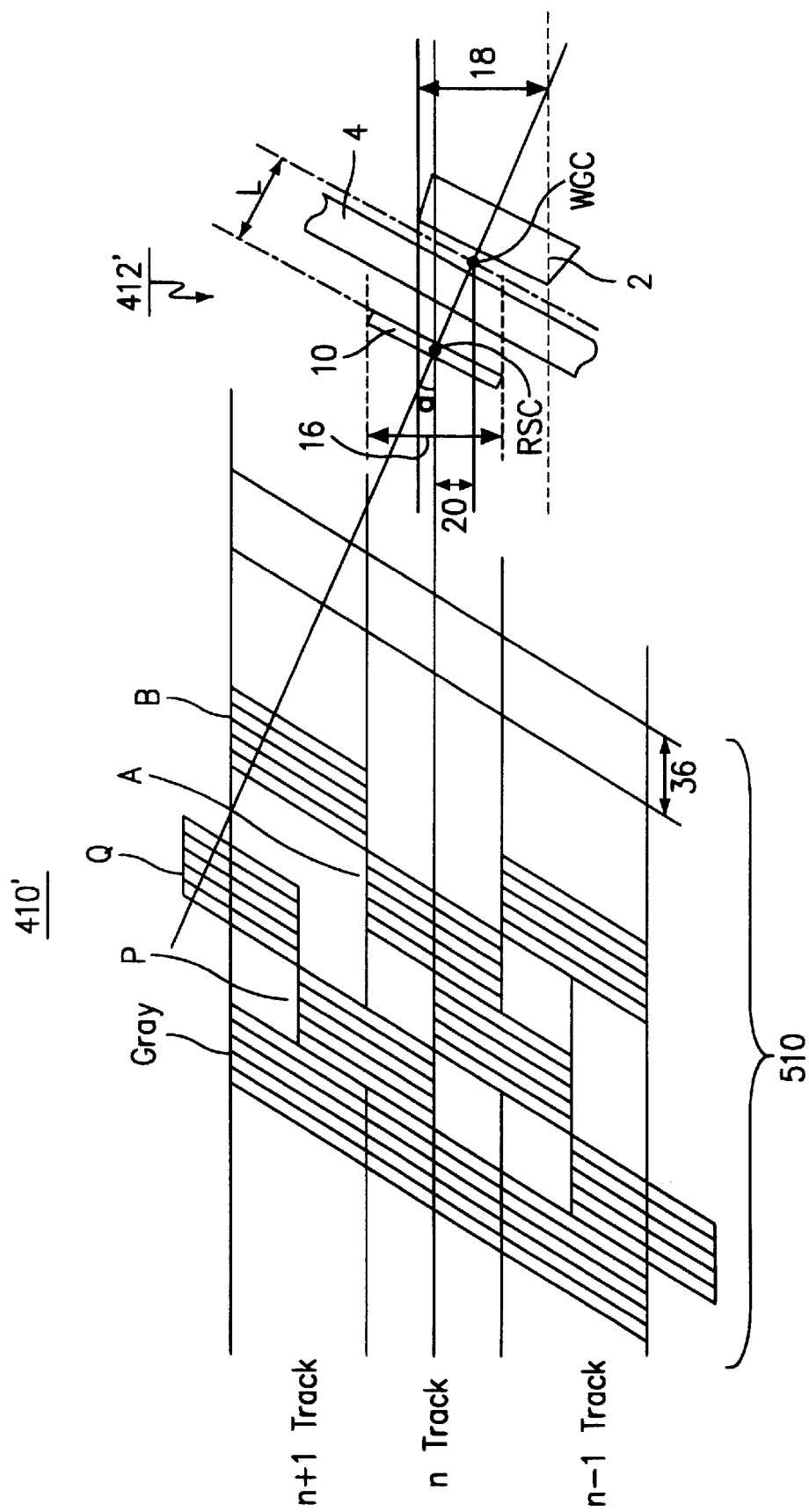
FIG. 5A is a diagram depicting a magnetoresistive head and a servo sector prior to writing an additional burst in accordance with the present invention.
Figure 5B:
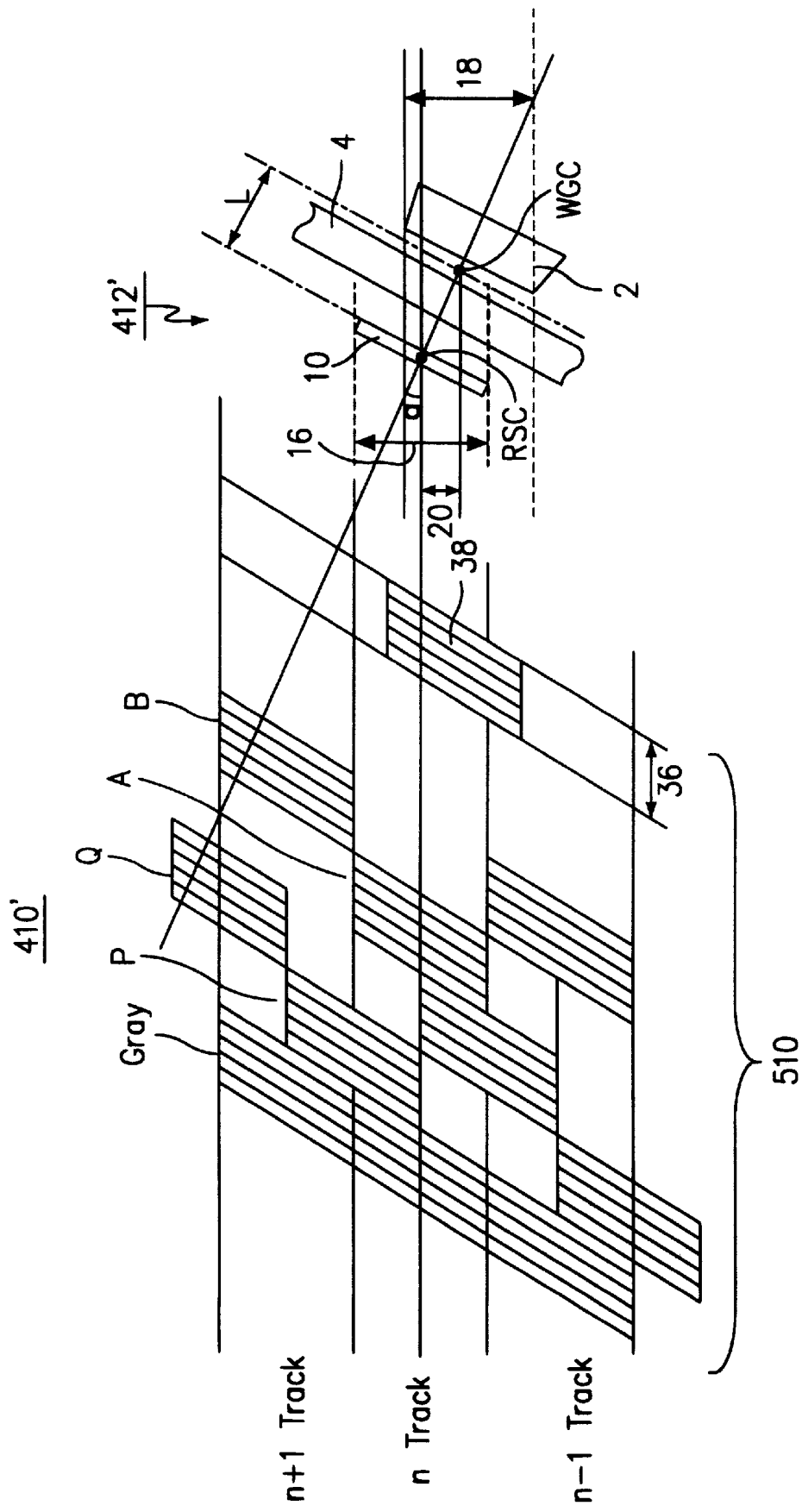
FIG. 5B is a diagram similar to FIG. 5A wherein an additional burst is written while a read portion of a magnetoresistive head is track-centered, in accordance with the present invention.
Figure 5C:
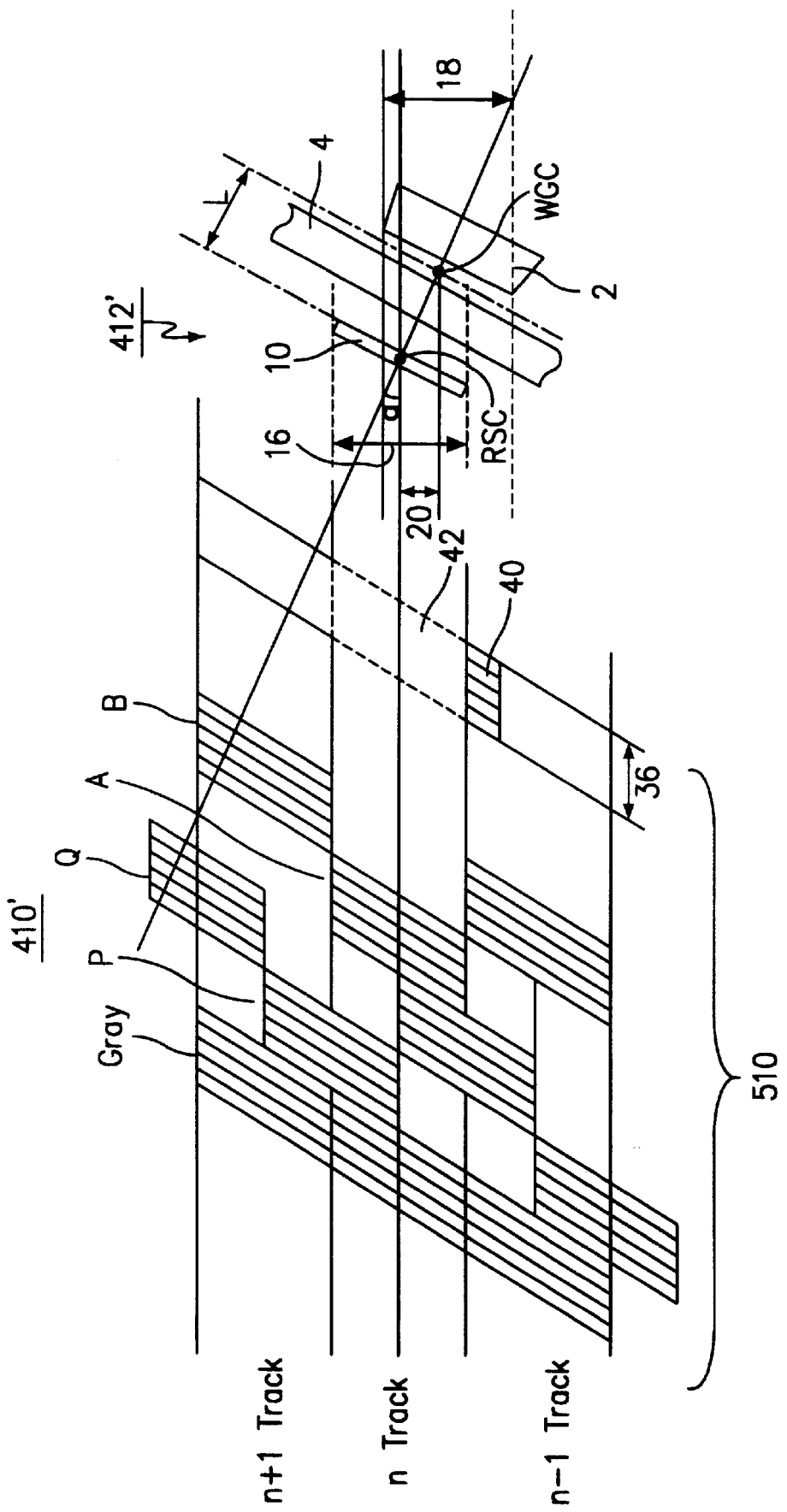
FIG. 5C is a diagram similar to FIG. 5B wherein the final state of an additional burst has been written to the servo sector in accordance with the present invention.

FIGS. 5A–5C illustrate an exemplary method, in accordance with the present invention, for writing an additional burst signal to a disk 410' of the hard disk drive of FIG. 4 as part of a test process for the disk drive. FIG. 5A shows the arrangement of a servo sector 510 of disk 410' after a servo writing process has been performed by a servo writer (not shown). FIG. 5B shows servo sector 510 with MR sensor 10 of a magnetoresistive head 412' centered over a track n and an additional burst 38 written into a designated area. FIG. 5C shows the condition of servo sector 510 after a final burst 42 has been written into a further designated area.

FIG. 5A shows the condition of servo sector 510 after the servo writer has written, for example, four burst signals P, Q, A, and B for each of the tracks of disk 410'. In this state, servo sector 510 includes an area 36 available for writing additional burst signals. To write such an additional signal for track n, microcontroller 424 detects the four burst signals P, Q, A and B and thereby positions magnetoresistive head 412' so that MR sensor 10 is centered over track n. This on-track condition exists when MR sensor 10 generates detection signals corresponding to burst signals P and Q with the same magnitude. Microcontroller 424 writes additional burst signal 38 (FIG. 5B) into area 36 upper pole 2 of magnetoresistive head 412'. It is noted here that additional burst signal 38 overlaps the (n−1)-st track by track shift amount 20.

Microcontroller 424 then detects additional burst signal 38 while gradually off-tracking MR sensor 10. As MR sensor 10 is gradually off-tracked, the magnitude of the detection signal corresponding to additional burst signal 38 gradually increases while the off-track distance is less than the amount of track shift 20. The magnitude of the detection signal reaches a maximum when the off-track distance equals the amount of track shift 20 and then decreases when the off-track distance exceeds the amount of track shift 20. A burst signal segment 42 (FIG. 5C) represents the off-track distance of MR sensor 10 at which the detection signal for additional burst signal 38 reaches its maximum. As illustrated in FIG. 5C, additional burst signal 38 is modified by burst signal segment 42 through DC erasure, whereby a final burst signal 40 is written. Final signal 40 indicates the optimal off-track distance for to track n, which is equal to the amount of track shift 20 corresponding to magneto-resistive head 412' at track n.

Figure 6:
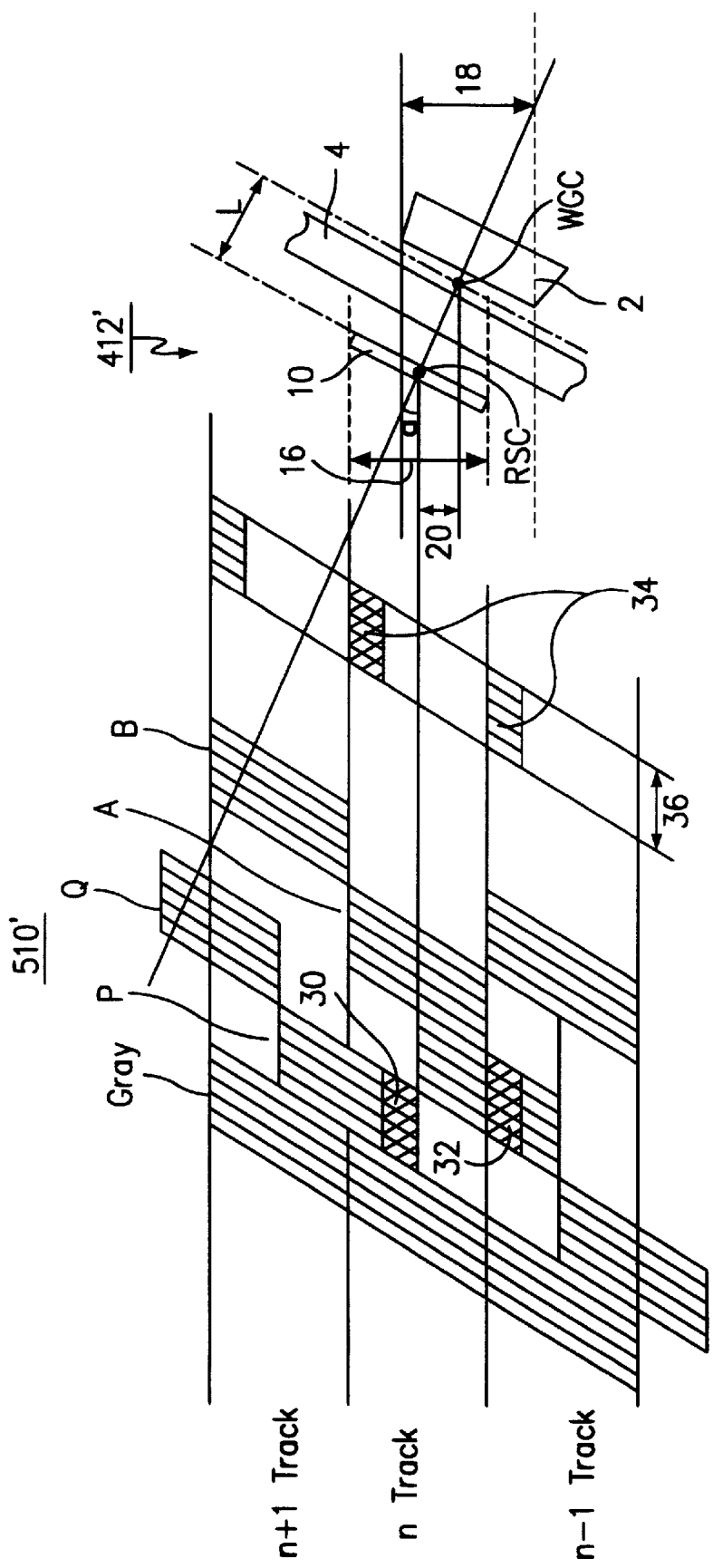
FIG. 6 is a diagram of a portion of a magnetic disk having additional servo bursts written in a servo sector in accordance with the present invention and as illustrated in FIGS. 5A–5C.

FIG. 6 illustrates a portion of a disk 510' having additional servo bursts written thereon in accordance with the present invention. In a test process, after standard servo information is written, an additional burst 34 indicating an optimal off-track distance is written into area 36 of each servo sector for each track of disk 510'. The presence of additional bursts 34 on disk 510' enables the disk drive to optimally compensate for the track shifts associated with magnetoresistive head 412'. The present invention encompasses various methods for carrying out this optimal compensation.

In one embodiment of the present invention, magnetoresistive head 412' is on-tracked at a specified track n by positioning MR sensor 10 so that burst signals P and Q are detected with detection signals of the same magnitude. With MR sensor 10 in this position, data written by write poles 2 and 4 will be written upon a write track that is shifted toward the (n−1)-st track with respect to the nominal (read) center of track n. To compensate for this shift when reading data from shifted write track of track n, MR sensor 10 is purposely off-tracked toward the (n−1)-th track to center it with respect to the write track. The optimal off-track distance for off-tracking MR sensor 10 is indicated by additional burst signal 34 and burst signals P and Q through the following equation (1):

$$DSM(P)+\{2\times DSM(34)\}=DSM(Q), \quad (1)$$

where DSM(S) stands for the detection signal magnitude for the burst signal S. (Thus, DSM(P)=detection signal magnitude for burst signal P, DSM(R)=detection signal magnitude for additional burst signal 34 (i.e., DSM(34)), and DSM(Q)=detection signal magnitude for burst signal Q.)

In an alternative embodiment, data is read at the nominal (read) center of track n, that is, by on-tracking magnetoresistive head at track n by positioning MR sensor 10 so that the detection signals for burst signals P and Q have equal magnitude. Data is written at this same track center with write poles 2 and 4 by purposely off-tracking MR sensor 10 toward an (n+1)-st track. The optimal off-track distance for off-tracking MR sensor 10 is indicated by the additional burst signal 34 in this embodiment also, but here is calculated through the following equation (2):

$$DSM(Q)+\{2\times DSM(34)\}=DSM(P) \quad (2)$$

The disk drive, magnetic disk, and methods discussed above and embodying the present invention illustratively pertain to the case where the disk has a plurality of concentrically arranged data tracks on a storage surface of the disk. In this first case, each one of the data tracks has a substantially well defined radial position corresponding to the radius of the data track with respect to the axis of revolution of the disk and the track shift for the data track is determined in part by the radial position of the data track.

It is noted that an alternative disk drive configuration exists in which the disk has a single, spirally configured data track, rather than a plurality of data tracks with each data track having a well-defined radius. However, persons of skill in the disk drive servo control arts will readily understand that the present invention also applies to the case of a single, spirally configured data track. In this second case, the data track itself will not have a single well defined radial position, and thus a single track shift will not exist for the data track. Readily understood adaptations of the present invention allow it to be applied to this second case, though, because each servo sector in the spiral data track will have a well-defined radial position. Rather than compensation for a track shift corresponding to a given data track, then, the present invention in this second case provides for compensation for a track shift corresponding to a given sector servo of the spiral data track.

As noted above, a hard disk drive with a magnetoresistive head and constructed in accordance with the present invention first detects an optimal off-track for each track in an initial test process. An additional burst signal is then written at a specific location of each servo sector for each track of the disk, and this additional burst signal is used during subsequent track following operations. This hard disk drive configuration, as well as the hard disk with additional burst signals, the method of writing those additional burst signals, and the method of compensating for track shifts using those additional burst signals, allows the track density that can be accommodated by the magnetoresistive head to be increased. In so doing, the present invention also provides increased resolution and sensitivity of servo control in the disk drive.

It should be understood that the present invention is not limited to the particular embodiment disclosed herein as the best mode contemplated for carrying out the present invention, and neither is it limited to any of the specific embodiments described in this specification. Rather, the present invention encompasses the entire scope of subject matter as defined by the claims appended hereto.

What is claimed is:

1. A magnetic disk drive apparatus, comprising:
    a magnetic disk having a storage surface and a plurality of data tracks arranged concentrically on said storage surface;
    a magnetoresistive head located movably adjacent to said storage surface and including a magnetoresistive sensor and a write pole separated from said magnetoresistive sensor by a predetermined distance, with said magnetoresistive head having associated therewith for each one of said plurality of data tracks a track shift corresponding to said data track;
    a memory storing program data representative of an execution program, with said program data including data representative of an initialization routine for controlling said magnetoresistive head to write a plurality of additional burst signals for a selected one of said plurality of data tracks, with said additional burst signals indicating an optimal off-track distance for positioning said magnetoresistive head to compensate for said track shift corresponding to said data track; and
    a microcontroller in communication with said memory and adapted to control a radial position of said magnetoresistive head with respect to said storage surface in accordance with said execution program.

2. The apparatus of claim 1, wherein said write pole includes an upper pole and a lower pole separated from said upper pole by a gap and said predetermined distance is a distance between a center of said gap and a center of said magnetoresistive sensor.

3. The apparatus of claim 1, further comprising a rotary actuator that rotatingly supports said magnetoresistive head adjacent to said storage surface.

4. The apparatus of claim 1, wherein said memory includes a read-only memory.

5. A magnetic disk drive apparatus, comprising:
    a magnetic disk having a storage surface and a plurality of data tracks arranged concentrically on said storage surface;
    a magnetoresistive head located movably adjacent to said storage surface and including a magnetoresistive sensor and a write pole separated from said magnetoresistive sensor by a predetermined distance with said magnetoresistive head having associated therewith for each one of said plurality of data tracks a track shift corresponding to said data track;
    a microcontroller adapted to control a radial position of said magnetoresistive head with respect to said storage surface in accordance with an execution program; and
    a memory storing program data representative of said execution program, with said program data including data representative of a compensation routine for compensating for said track shift corresponding to a selected one of said plurality of data tracks by positioning said magnetoresistive head at an optimal off-track distance from a center of said data track in response to a detection signal corresponding to a plurality of additional burst signals for each said data track and with said additional burst signals indicating said optimal off-track distance.

6. The apparatus of claim 5, wherein said write pole includes an upper pole and a lower pole separated from said upper pole by a gap and said predetermined distance is a distance between a center of said gap and a center of said magnetoresistive sensor.

7. The apparatus of claim 5, further comprising a rotary actuator that rotatingly supports said magnetoresistive head adjacent to said storage surface.

8. The apparatus of claim 5, wherein said memory includes a read-only memory.

9. A magnetic disk, comprising:
    a storage surface; and
    a plurality of data tracks arranged concentrically on said storage surface, with each one of said data tracks having a plurality of additional burst signals indicating an optimal off-track distance for positioning a magnetoresistive head associated with said magnetic disk at a position to compensate for a track shift associated with said magnetoresistive head and corresponding to said data track.

10. A method for initializing a magnetic disk of a hard disk drive apparatus having a magnetoresistive head associated with said magnetic disk, said method comprising the steps of:
    positioning a magnetoresistive sensor of said magnetoresistive head at an on-track position with respect to a specified data track of said magnetic disk;
    writing a first additional burst signal in an additional burst signal area of a servo sector of said data track with a write pole of said magnetoresistive head while said magnetoresistive sensor is positioned in said on-track position;

generating with said magnetoresistive sensor a detection signal corresponding to said first additional burst signal while gradually moving said magnetoresistive sensor away from said on-track position in a direction corresponding to an increase in a magnitude of said detection signal;

identifying as an optimal off-track distance for said data track a distance of said magnetoresistive sensor away from said on-track position for which said magnitude of said detection signal has a maximum value; and writing a second additional burst signal in said additional burst signal area, with said second additional burst signal indicating said optimal off-track distance for said data track.

11. A method of compensating for track shifts associated with a magnetoresistive head of a magnetic disk drive apparatus, said method comprising the steps of:

positioning a magnetoresistive sensor of said magnetoresistive head at an on-track position with respect to a specified data track of a magnetic disk associated with said magnetoresistive head;

reading an additional burst signal for said data track, with said additional burst signal indicating an optimal off-track distance for positioning said magnetoresistive head to compensate for a track shift associated with said magnetoresistive head and corresponding to said data track; and positioning said magnetoresistive read sensor at said optimal off-track distance away from said on-track position;

wherein said step of positioning said magnetoresistive sensor at said optimal off-track distance away from said on-track position includes determining a position of said magnetoresistive sensor at which a magnitude DSM(P) of a detection signal corresponding to a first one P of four existing servo burst signals, a magnitude DSM(Q) of a detection signal corresponding to a second one Q of said four existing servo burst signals, and a magnitude DSM(R) of a detection signal corresponding to said additional burst signal satisfy one of the following equations:

$$DSM(P)+\{2 \times DSM(R)\}=DSM(Q); \text{ and}$$

$$DSM(Q)+\{2 \times DSM(R)\}=DSM(P).$$

12. The method of claim 11, further comprising the steps of:

reading data from said data track with said magnetoresistive head while said magnetoresistive sensor is positioned at said on-track position; and writing data to said data track with said magnetoresistive head while said magnetoresistive sensor is positioned at said optimal distance away from said on-track position.

13. The method of claim 12, wherein said step of positioning said magnetoresistive sensor at said on-track position includes reading a pattern of said tour existing servo burst signals from said data track.

14. The method of claim 11, further comprising the steps of:

writing data to said data track with said magnetoresistive head while said magnetoresistive sensor is positioned at said on-track position; and reading data from said data track with said magnetoresistive head while said magnetoresistive sensor is positioned at said optimal distance away from said on-track position.

15. The method of claim 14, wherein said step of positioning said magnetoresistive sensor at said on-track position includes reading a pattern of said four existing servo burst signals from said data track.

16. The method of claim 11, wherein said step of positioning said magnetoresistive sensor at said on-track position includes reading a pattern of said four existing servo burst signals from said data track.

17. A magnetic disk, comprising:

a storage surface; and a plurality of data tracks arranged concentrically on said storage surface, with a selected one of said data tracks having an additional burst signal indicating an optimal off-track distance for positioning a magnetoresistive head associated with said magnetic disk at a position to compensate for a track shift associated with said magnetoresistive head and corresponding to said data track;

wherein said magnetoresistive head is positioned by determining a position of said magnetoresistive sensor at which a magnitude DSM(P) of a detection signal corresponding to a first one P of said four existing servo burst signals, a magnitude DSM(Q) of a detection signal corresponding to a second one Q of said four existing servo burst signals, and a magnitude DSM(R) of a detection signal corresponding to said additional burst signal satisfy one of the following equations:

$$DSM(P)+\{2 \times DSM(R)\}=DSM(Q); \text{ and}$$

$$DSM(Q)+\{2 \times DSM(R)\}=DSM(P).$$

* * * * *